(12) United States Patent
Avaux

(10) Patent No.: US 6,318,939 B1
(45) Date of Patent: Nov. 20, 2001

(54) FASTENING DEVICE

(75) Inventor: Alain Avaux, Thuin (BE)

(73) Assignee: Pandrol Limited, Surrey (GB)

( * ) Notice: Subject to any disclaimer, the term of this patent is extended or adjusted under 35 U.S.C. 154(b) by 0 days.

(21) Appl. No.: 09/529,459

(22) PCT Filed: Oct. 23, 1998

(86) PCT No.: PCT/GB98/03179

§ 371 Date: Apr. 14, 2000

§ 102(e) Date: Apr. 14, 2000

(87) PCT Pub. No.: WO99/22071

PCT Pub. Date: May 6, 1999

(30) Foreign Application Priority Data

Oct. 23, 1997 (GB) .................................................. 9722432

(51) Int. Cl.$^7$ .............................. F16B 39/24; F16B 43/00
(52) U.S. Cl. .................... 411/153; 411/157; 411/533; 411/544
(58) Field of Search ..................................... 411/153, 155, 411/156, 157, 158, 159, 368, 533, 544

(56) References Cited

U.S. PATENT DOCUMENTS

| | | | |
|---|---|---|---|
| 1,908,215 | * 5/1933 | Berge | ................................... 411/157 |
| 2,283,494 | 5/1942 | Erdman . | |
| 2,672,069 | 2/1954 | Mitchell . | |
| 2,779,375 | 1/1957 | O'Connor . | |
| 2,779,376 | 1/1957 | Poupitch . | |
| 3,181,584 | 5/1965 | Borowsky . | |
| 3,777,796 | 12/1973 | Takano . | |
| 3,913,649 | 10/1975 | Stanaitis . | |
| 3,971,086 | 7/1976 | Stanaitis . | |
| 4,204,566 | 5/1980 | Kirrish et al. . | |
| 4,292,007 | 9/1981 | Wagner . | |
| 4,589,809 | 5/1986 | Moore et al. . | |
| 4,630,984 | 12/1986 | Reinwall et al. . | |
| 4,781,503 | 11/1988 | Bögel . | |
| 4,907,923 | 3/1990 | McGrath, Jr. . | |
| 5,308,285 | 5/1994 | Malen et al. . | |

FOREIGN PATENT DOCUMENTS

| | | | |
|---|---|---|---|
| 3411122 | 10/1985 | (DE) . | |
| 3601697 | 4/1987 | (DE) . | |
| 9016087 | 3/1991 | (DE) . | |
| 4317097 | 11/1994 | (DE) . | |
| 4406105 | 8/1995 | (DE) . | |
| 29619480 | 2/1997 | (DE) . | |
| 0156349 | 7/1988 | (EP) . | |
| 0389746 | 10/1990 | (EP) . | |
| 0460778 | 12/1991 | (EP) . | |
| 2571758 | 4/1986 | (FR) . | |
| 191441 | 7/1921 | (GB) . | |
| 341333 | 3/1930 | (GB) . | |
| 674213 | 4/1950 | (GB) . | |
| 806990 | 12/1956 | (GB) . | |
| 973334 | 4/1963 | (GB) . | |
| 1350348 | 7/1971 | (GB) . | |
| 1426658 | 1/1974 | (GB) . | |
| 672178 | * 10/1964 | (IT) | ..................................... 411/157 |

* cited by examiner

*Primary Examiner*—Neill Wilson
(74) *Attorney, Agent, or Firm*—Norbert P. Holler

(57) ABSTRACT

A fastening device (20), for use in holding a base plate down to a railway sleeper. The device is of the type having a head portion (21), a screw-threaded shank portion (22) and an intermediate portion (23) connecting the head portion (21) to the screw-threaded shank portion (22), with the intermediate portion (23) and the screw-threaded shank portion (22) being of smaller diameter than the head portion (21). The intermediate portion (23) at the axial end region thereof adjacent to the head portion (21) has a circumferential part (23b) which has an external diameter somewhat greater than the diameter of the remainder of the intermediate portion (23), and the external diameter of the circumferential part (23b) relative to the internal diameter of a spring washer (15) is such that, when the spring washer is fitted onto and encircles the circumferential part (23b), the spring washer (15) is resiliently retained in place on the intermediate portion (23) prior to use of the device (20), regardless of the orientation of the device.

2 Claims, 1 Drawing Sheet

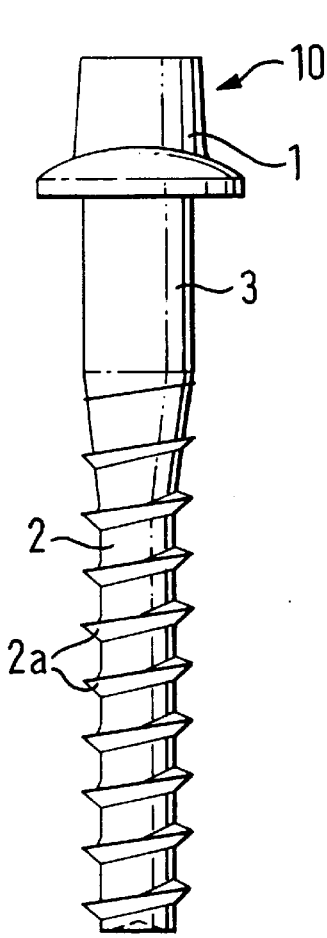
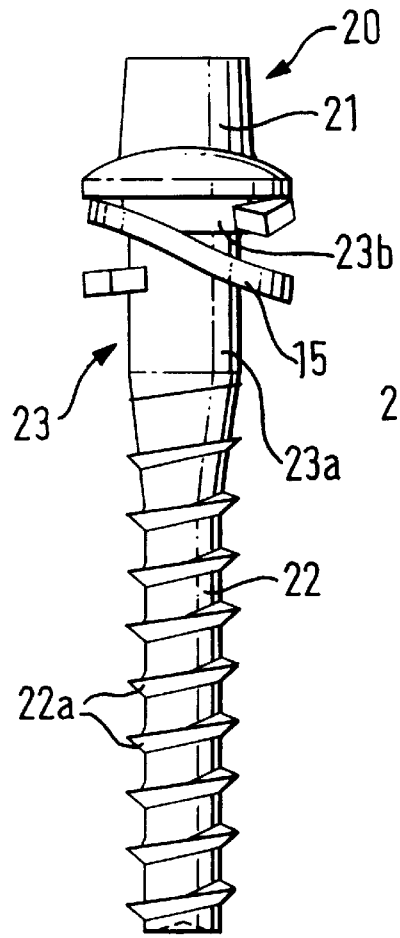
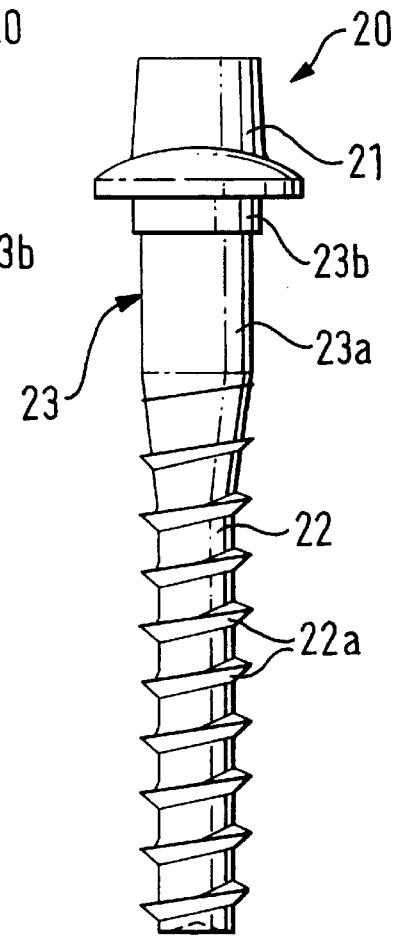
FIG. 1
PRIOR ART
FIG. 2
FIG. 3
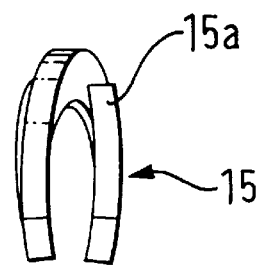
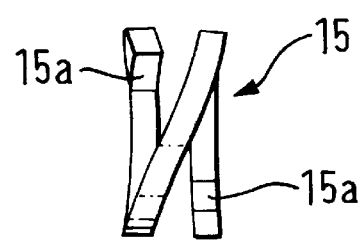
FIG. 4a
FIG. 4b

FASTENING DEVICE

The present invention relates to a fastening device for use in holding a base plate down to a railway sleeper, and in particular to the type of fastening device having a head and a screw-threaded shank, commonly known as a screwspike which is used on wooden sleepers.

BACKGROUND OF THE INVENTION

Screwspikes are used quite widely in Europe, and to an increasing extent in the United States of America. They have some advantages over older types of rail fastenings known as "cutspikes" and "lockspikes" in that, because the screwspike has a narrow threaded shank, screwspikes have less tendency to work loose during use. Many railway authorities believe that this tendency can be further reduced by placing a spring washer under the head of the screwspike, so that a modest load is always applied to the thread of the screw during use.

BRIEF SUMMARY OF THE INVENTION

According to an embodiment of the present invention there is provided a fastening device for use in holding a base plate down to a railway sleeper, the device having a head portion, a screw-threaded shank portion and an intermediate portion connecting the head portion to the screw-threaded portion, the intermediate portion and the screw-threaded portion being of smaller diameter than the head portion, and the device being adapted to retain a spring washer on the said intermediate portion prior to use regardless of the orientation of the device.

Preferably the spring washer is retained by means of a washer-retaining part provided on the intermediate portion adjacent to the head portion, which washer-retaining part is of larger diameter than the part of that intermediate portion adjacent to the screw-threaded shank portion. The washer-retaining part may be of uniform external diameter along substantially its entire length, preferably such that the external diameter is approximately the same as the internal diameter of the spring washer to be retained thereon.

BRIEF DESCRIPTION OF THE DRAWINGS

Reference will now be made, by way of example, to the accompanying drawings, in which:

FIG. 1 shows a prior art fastening device;

FIG. 2 shows a fastening device embodying the present invention on which a spring washer is retained;

FIG. 3 shows the fastening device of FIG. 2 without the spring washer; and

FIG. 4a and 4b show respective side views of the spring washer shown in FIG. 2.

DETAILED DESCRIPTION OF THE INVENTION

The known fastening device shown in FIG. 1 is of the type known as a screwspike. The screwspike 10 of FIG. 1 has a head portion 1, a screw-threaded shank portion 2 having a screw-thread 2a, and an intermediate portion 3 connecting head portion 1 to the screw-threaded shank portion 2. The intermediate portion 3 is of uniform diameter along its entire axial length. Typically such a screwspike has an overall length of around 197 mm, of which the head portion 1 is around 32 mm long, the intermediate portion 3 is around 38 mm long and the screw-threaded shank portion 2 is around 127 mm long. The diameter of the intermediate portion is around 24 mm.

A screwspike 20 embodying the present invention and shown in FIGS. 2 and 3 is a modified version of the screwspike 10. The screwspike 20 has a head portion 21 substantially identical to the head portion 1 of the screwspike 10 and a screw-threaded shank portion 22 with screw-thread 22a substantially identical to the screw-threaded shank portion 2 and screw-thread 2a of the screwspike 10. However, the screwspike 20 differs from the screwspike 10 in that it has an intermediate portion 23 between the head portion 21 and screw-threaded shank portion 22 having a washer-retaining part 23b which is of larger diameter than the remainder 23a of that intermediate portion 23.

By way of example, a screwspike 20 of overall length 197 mm, in which the head portion 21 is around 32 mm long, the intermediate portion 23 is around 38 mm long and the screw-threaded shank portion 22 is around 127 mm long, has a washer-retaining portion 23b with a diameter of around 26 mm and a length of around 7 mm, the remainder 23a of the intermediate portion 23 having a diameter of around 24 mm and a length of around 31 mm.

As shown in FIG. 2 the screwspike 20 can retain a spring washer 15 (shown in more detail in FIGS. 4a and 4b) on its washer-retaining part 23b. The outside diameter of the washer-retaining part 23b is chosen such that it is similar to the inside diameter of the spring washer 15 to be retained. Thus, when the spring washer 15 is pushed onto the washer-retaining part 23b of the screwspike 20 the spring washer 15 deflects slightly and one of its free ends 15a digs into the washer-retaining part 23b, fixing it firmly in place. The length of the washer-retaining part 23b is determined such that it is long enough to retain the top coil of the spring washer 15, but is not so long as to interfere with the compression of the rest of the spring washer 15 when in use.

Therefore, in this way, a screwspike embodying the present invention, such as the screwspike 20, can be applied to a railway track with a spring washer 15 already attached to it. This can enable the installation procedure to be speeded up by reducing the amount of labour involved. In particular, nowadays screwspikes are often installed in track by drilling holes in the sleeper, using the holes in the base plate as a jig, with a simple track-mounted machine, and then applying the screwspikes with a second simple track-mounted machine. This second machine has a magazine into which the screwspikes are fed and then inserted into the holes and screwed down by the machine. If the screwspikes are to be used with washers, however, such a machine cannot be used, since the machine cannot thread washers onto the screwspikes automatically nor can it hold the washers in the correct place on the screwspikes as they pass through the magazine and are subsequently screwed into holes in the sleepers. However, a spring washer 15 could be retained on a screwspike embodying the present invention without any need for special handling by the machine. Moreover, screwspikes embodying the present invention would enable the logistical problem of shipping equal numbers of screwspikes and washers to site to be reduced. The possibilities for wastage of surplus washers or screwspikes which might otherwise be discarded are similarly reduced.

Although at present fastening devices of the screwspike type are used on wooden sleepers, it is envisaged that in future screwspike-type fastening devices such as that embodying the present invention might also be used on sleepers made of other materials, such as plastics material or concrete (provided with nylon inserts for receiving the screwspike).

What is claimed is:

1. A fastening device (20) for use in holding a base plate down to a railway sleeper, the device (20) having a head portion (21), a screw-threaded shank portion (22) and an intermediate portion (23) connecting the head portion (21) to the screw-threaded shank portion (22), the intermediate portion (23) and the screw-threaded shank portion (22) being of smaller diameter than the head portion (21); characterized in that a spring washer (15) is retained on the device (20) prior to use, regardless of the orientation of the device (20), by means of a washer-retaining part (23*b*) provided on said intermediate portion (23) adjacent to said head portion (21), said washer-retaining part (23*b*) having a larger external diameter than a part (23*a*) of said intermediate portion (23) adjacent to said screw-threaded shank portion (22), and said external diameter of said washer-retaining part (23*b*) being uniform along substantially its entire axial length, said spring washer (15) having an internal diameter sized so as to enable said spring washer (15) to be held resiliently on said washer-retaining part (23*b*).

2. A fastening device as claimed in claim 1, wherein said external diameter of said washer-retaining part (23*b*) is approximately the same as said internal diameter of said spring washer (15).

\* \* \* \* \*